(12) United States Patent
Kimura et al.

(10) Patent No.: US 8,277,535 B2
(45) Date of Patent: Oct. 2, 2012

(54) METHOD FOR PRODUCING POROUS METAL BODY, POROUS ALUMINUM BODY, BATTERY ELECTRODE MATERIAL INCLUDING POROUS METAL BODY OR POROUS ALUMINUM BODY, AND ELECTRODE MATERIAL FOR ELECTRICAL DOUBLE LAYER CAPACITOR

(75) Inventors: Koutarou Kimura, Osaka (JP); Koji Nitta, Osaka (JP); Akihisa Hosoe, Osaka (JP); Shinji Inazawa, Osaka (JP); Kazuki Okuno, Itami (JP); Masatoshi Majima, Osaka (JP); Hajime Ota, Osaka (JP); Shoichiro Sakai, Osaka (JP); Kengo Goto, Osaka (JP); Tomoyuki Awazu, Itami (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/236,041

(22) Filed: Sep. 19, 2011

(65) Prior Publication Data

US 2012/0070735 A1    Mar. 22, 2012

Related U.S. Application Data (63) Continuation of application No. PCT/JP2011/056152, filed on Mar. 16, 2011.

(30) Foreign Application Priority Data

Mar. 26, 2010  (JP) .................................. 2010-072348
Dec. 17, 2010  (JP) .................................. 2010-281938

(51) Int. Cl.
*C22B 21/00* (2006.01)
(52) U.S. Cl. .......... 75/415; 205/105; 427/230; 427/244; 427/247
(58) Field of Classification Search ................ 75/415; 205/150; 427/244, 247, 230
See application file for complete search history.

(56) References Cited

U.S. PATENT DOCUMENTS 6,465,133 B1 * 10/2002 Kariya et al. ................ 429/235

FOREIGN PATENT DOCUMENTS

| JP | 05186893 A | * | 7/1993 |
|----|------------|---|--------|
| JP | 6-349481   |   | 12/1994 |
| JP | 8-170126   |   | 7/1996 |
| JP | 2001-155739 |  | 6/2001 |
| JP | 2002-100366 |  | 4/2002 |
| JP | 2005-285629 |  | 10/2005 |
| JP | 4176975    |   | 8/2008 |

* cited by examiner

*Primary Examiner* — George Wyszomierski
*Assistant Examiner* — Tima M McGuthry Banks
(74) *Attorney, Agent, or Firm* — Drinker Biddle & Reath LLP (57) ABSTRACT

A porous metal body containing continuous pores and having a low oxygen content is provided by decomposing a porous resin body that contains continuous pores and has a layer of a metal thereon by heating the porous resin body at a temperature equal to or less than the melting point of the metal while the porous resin body is immersed in a first molten salt and a negative potential is applied to the metal layer; and a method for producing the porous metal body is provided.

9 Claims, 7 Drawing Sheets

METHOD FOR PRODUCING POROUS METAL BODY, POROUS ALUMINUM BODY, BATTERY ELECTRODE MATERIAL INCLUDING POROUS METAL BODY OR POROUS ALUMINUM BODY, AND ELECTRODE MATERIAL FOR ELECTRICAL DOUBLE LAYER CAPACITOR

CROSS-REFERENCE TO RELATED APPLICATION

This application is a continuation of International Application PCT/JP2011/056152 filed on Mar. 16, 2011, claiming priority to Japanese patent applications No. 2010-072348 filed on Mar. 26, 2010, and No. 2010-281938 filed on Dec. 17, 2010, the entireties of which are incorporated herein by reference.

TECHNICAL FIELD

The present invention relates to a porous metal body that can be suitably used as the collector of a battery electrode and an electrode for an electrical double layer capacitor.

BACKGROUND ART

Aluminum has an excellent conductive property and is used as an electrode material of a battery such as a lithium-ion battery. For example, the positive electrode of a lithium-ion battery is constituted by an aluminum foil to the surfaces of which an active material such as lithium cobalt oxide is applied.

To increase the capacity of such a positive electrode, a porous aluminum body can be used so that the surface area of the positive electrode is increased and the aluminum body is filled with an active material; in this case, the active material is available even when the thickness of the electrode is large, and hence the availability ratio of the active material per unit area increases.

Such a porous aluminum includes an aluminum nonwoven fabric formed by entanglement of fibrous aluminum and an aluminum foam formed by foaming of aluminum. Patent Literature 1 discloses a method for producing a metal foam containing a large number of independent bubbles by adding a foaming agent and a thickening agent to a molten metal and stirring the resultant mixture.

As a porous metal, there is a porous nickel body that is commercially available under the trade name Celmet (registered trademark). Celmet (registered trademark) is a porous metal body that has continuous pores and has a high porosity (90% or more). This is obtained by forming a nickel layer on the surface of the skeleton of a porous resin body containing continuous pores such as a urethane foam, subsequently decomposing the porous resin body by a heat treatment, and subjecting the nickel to a reduction treatment. The nickel layer is formed in the following manner: the porous resin body is subjected to a conductive treatment by the application of carbon powder or the like to the surface of the skeleton of the porous resin body, and nickel is subsequently deposited on the porous resin body by electroplating.

Patent Literature 2 discloses a method for producing a porous metal body in which the production method of Celmet is applied to aluminum. Specifically, a film of a metal (copper or the like) that forms a eutectic alloy with aluminum at a temperature equal to or less than the melting point of aluminum is formed on the skeleton of a porous resin body having a three-dimensional network structure; the porous resin body is subsequently coated with aluminum paste; the resultant body is subjected to a heat treatment at a temperature of 550° C. or more and 750° C. or less in a non-oxidizing atmosphere to evaporate the organic constituent (porous resin body) and to sinter the aluminum powder to thereby provide the porous metal body. Patent Literature 2 states that, although aluminum forms a strong oxide film and hence has sintering resistance, aluminum powder applied on a film of a metal that forms a eutectic alloy with aluminum causes a eutectic reaction at the surface boundary between the aluminum powder and the metal film as a base in the process of a heat treatment to produce liquidus surfaces at a temperature equal to or less than the melting point of aluminum; and the partially produced liquidus surfaces breach the oxide film of aluminum so that sintering of the aluminum powder proceeds while the three-dimensional network skeleton structure is maintained.

CITATION LIST

Patent Literature

PTL 1: Japanese Patent No. 4176975
PTL 2: Japanese Unexamined Patent Application Publication No. 8-170126

SUMMARY OF INVENTION

Technical Problem

An aluminum nonwoven fabric and an aluminum foam tend to have an oxide film thereon because aluminum is heated to a temperature equal to or more than the melting point thereof in the production process and oxidation tends to proceed until the aluminum is cooled. Aluminum is susceptible to oxidation and it is difficult to reduce oxidized aluminum at a temperature equal to or less than the melting point. Accordingly, an aluminum nonwoven fabric and an aluminum foam that have a low oxygen content are not obtained. Although an aluminum foam containing independent bubbles (closed bubbles) has a large surface area as a result of foaming, effective use of the entire surface of the aluminum foam cannot be achieved. Accordingly, when such an aluminum foam is used as a battery electrode material (collector), it is difficult to increase the use efficiency of the active material.

The porous metal body of PTL 2 contains continuous pores and can be used as a battery electrode material. However, the resultant porous metal body is not composed of elemental aluminum but contains a metal element in addition to aluminum, and hence may have poor properties in terms of corrosion resistance and the like. The heat treatment needs to be performed at a temperature close to the melting point of aluminum to sinter aluminum and an oxide film may be formed on the surface of aluminum in spite of the non-oxidizing atmosphere.

Even when a metal other than aluminum is used, for example, in the production of a porous nickel body, the surface of nickel is oxidized in the step of decomposing a porous resin body by a heat treatment and hence a reduction treatment needs to be subsequently performed.

Accordingly, an object of the present invention is to provide a porous metal body that contains continuous pores and has a small amount of an oxide in the surface thereof (the thickness of an oxide layer is small), and a method for producing the porous metal body.

Solution to Problem

The present invention provides a method for producing a porous metal body, the method including a step of decomposing a porous resin body that contains continuous pores and has a layer of a metal thereon by heating the porous resin body at a temperature equal to or less than the melting point of the metal while the porous resin body is immersed in a first molten salt and a negative potential is applied to the metal layer (the first invention of the present application).

Figure 1A:
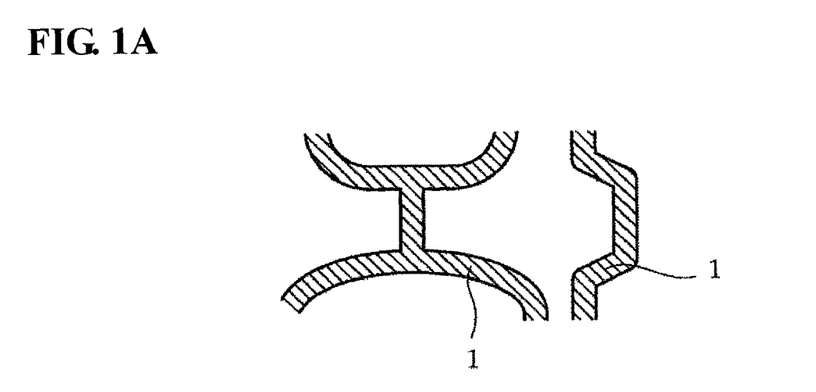
FIG. 1 is a schematic view illustrating steps of producing a porous metal body: the part (a) of FIG. 1 illustrates a portion of a section of a porous resin body containing continuous pores; the part (b) of FIG. 1 illustrates a state in which a metal layer is formed on the porous resin body; and the part (c) of FIG. 1 illustrates a porous metal body after evaporation of the porous resin body.
Figure 1B:
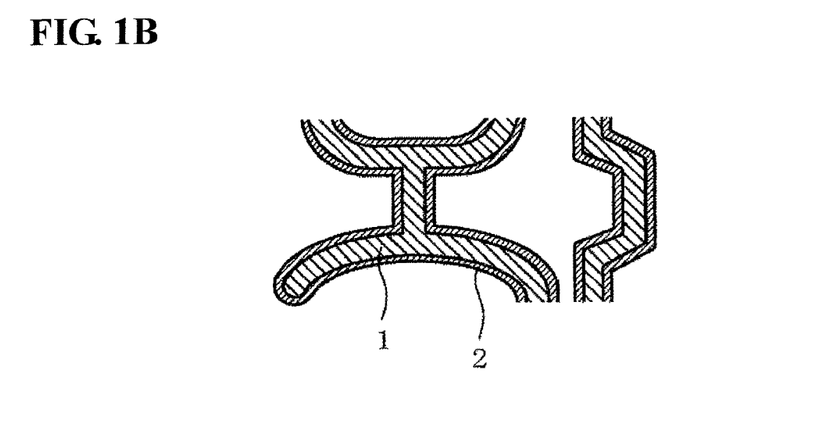
Figure 1C:
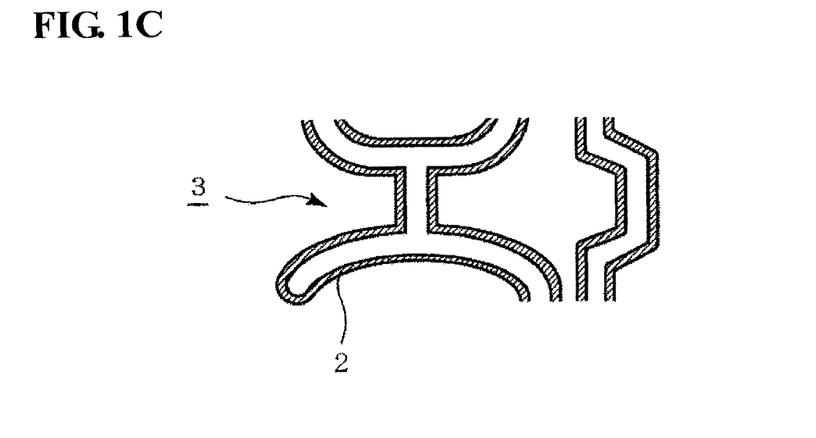

FIG. 1 is a schematic view illustrating a production method according to the present invention. The part (a) of FIG. 1 is an enlarged schematic view illustrating a portion of a section of a porous resin body containing continuous pores and illustrates a state in which the pores are formed in a porous resin body 1 serving as a skeleton. The porous resin body 1 containing continuous pores is provided; a layer 2 of a metal such as aluminum is formed on the surface of the porous resin body 1 to provide a metal-coated porous resin body (part (b) of FIG. 1); and the porous resin body 1 is subsequently decomposed and evaporated to thereby provide a porous metal body 3 constituted by the remaining metal layer (part (c) of FIG. 1).

Figure 2:
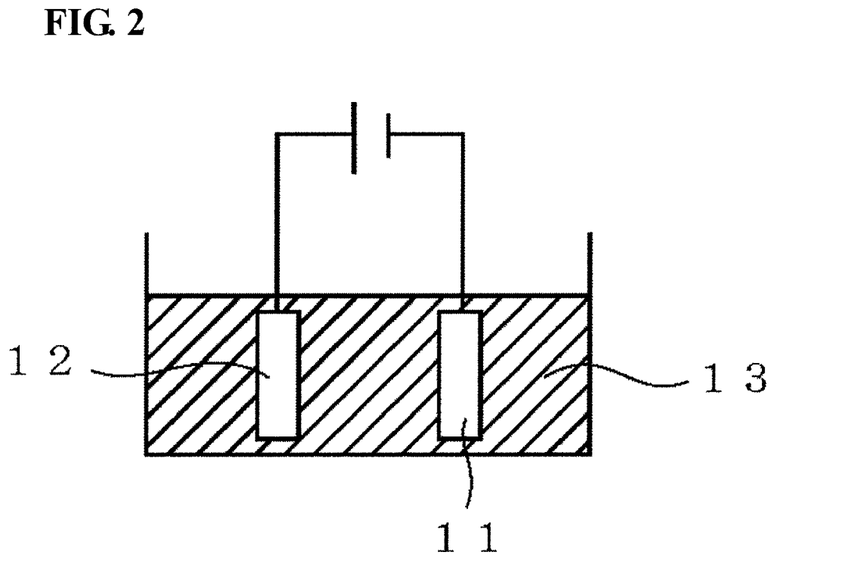
FIG. 2 is a schematic explanatory view of a step of decomposing a porous resin body in a molten salt.

The porous resin body is decomposed in a molten salt. As illustrated in FIG. 2, a porous resin body 11 having a metal layer thereon and a positive electrode 12 are immersed in a first molten salt 13, and a negative potential is applied to the metal layer. By applying a negative potential to the metal layer immersed in a molten salt, the oxidation of the metal can be suppressed. In such a state, by heating the porous resin body 11 having a metal layer thereon to a temperature equal to or more than the decomposition temperature of the porous resin body, the porous resin body is decomposed to provide a porous metal body constituted by the remaining metal. To prevent the metal from melting, the heating temperature is a temperature equal to or less than the melting point of the metal. When aluminum is selected as the metal, the heating is performed at a temperature equal to or less than the melting point (660° C.) of aluminum. In this way, a porous metal body having a thin oxide layer (low oxygen content) in the surface thereof can be obtained.

The first molten salt may be a halide or a nitrate of an alkaline metal or an alkaline earth metal with respect to which the electrode potential of the metal layer is less-noble. Specifically, the first molten salt preferably contains one or more selected from the group consisting of lithium chloride (LiCl), potassium chloride (KCl), sodium chloride (NaCl), aluminum chloride ($AlCl_3$), lithium nitrate ($LiNO_3$), lithium nitrite ($LiNO_2$), potassium nitrate ($KNO_3$), potassium nitrite ($KNO_2$), sodium nitrate ($NaNO_3$), and sodium nitrite ($NaNO_2$) (the second invention of the present application). Since the temperature of the molten salt is made to be a temperature equal to or less than the melting point of the metal, the molten salt is preferably a eutectic salt made to have a low melting point by mixing two or more salts. Specifically, the heating is preferably performed at a temperature of 380° C. or more and 600° C. or less (the ninth invention of the present application). In particular, such a method is advantageous when aluminum whose surface is susceptible to oxidation and is less likely to be reduced is used (the third invention of the present application).

In the step of decomposing the porous resin body, an antioxidant measure that suppresses oxidation of the metal layer is preferably provided (the fourth invention of the present application). When the porous resin body 11 that is to be treated and has a metal layer thereon is immersed in the first molten salt, oxidation of the metal layer can be suppressed by the application of a negative potential. However, the negative potential cannot be applied immediately before the porous resin body 11 is immersed in the molten salt. Since the first molten salt has a high temperature as described above, a region near a first molten salt bath, for example, an upper space of the molten salt bath has a high-temperature atmosphere and hence the metal layer may be oxidized immediately before the immersion in the first molten salt or immediately after the immersion in the first molten salt. In particular, when the porous resin body that is to be treated and has a metal layer thereon has a large area, such a problem tends to occur. Accordingly, an antioxidant measure is preferably provided.

The antioxidant measure is preferably configured to make an inert gas flow in the first molten salt (the fifth invention of the present application). By bubbling the first molten salt by making an inert gas flow in the first molten salt, the first molten salt becomes full of bubbles of the inert gas that are generated in the first molten salt; the bubbles rise from the liquid surface of the first molten salt to the space above the first molten salt so that the space above the first molten salt also becomes full of the inert gas. Accordingly, the oxidation of the metal layer can be suppressed before and after the immersion in the first molten salt. In the step of decomposing the porous resin body in the first molten salt, oxygen is generated from organic matter (porous resin body) decomposed; when this oxygen remains in the porous metal body, the metal may be oxidized. By making an inert gas flow in the first molten salt to cause bubbles of the inert gas to bump against a body to be treated (a porous resin body having a metal layer thereon or a porous metal body), the generated oxygen is expelled. In addition, by making an inert gas flow in the first molten salt, the first molten salt is stirred with the bubbles of the inert gas so that the first molten salt can be uniformly brought into contact with the interior of the porous body and the porous resin body can be efficiently decomposed.

The metal layer can be formed by a method, for example, a gas phase method such as vapor deposition, sputtering, or plasma chemical vacuum deposition (CVD); coating with a metal paste; or plating. When aluminum is selected as the metal, plating with aluminum in an aqueous solution is substantially impossible in terms of practicality and hence molten salt electrolytic plating of plating with aluminum in a molten salt is preferably performed. In a preferred embodiment of this plating, after the surface of the porous resin body is subjected to a conductive treatment, the porous resin body is plated with the metal in a second molten salt to form the metal layer (the sixth invention of the present application). The second molten salt may be aluminum chloride, potassium chloride, sodium chloride, or the like. When two or more salt components are used as a eutectic salt, the melting temperature becomes low, which is preferable. The second molten salt needs to contain at least one metal-ion component to be made to adhere.

Alternatively, the surface of the porous resin body may be coated with a metal paste to form the metal layer (the seventh invention of the present application). The metal paste is a mixture of a metal powder, a binder (binder resin), and an organic solvent. After the surface of the porous resin body is coated with the metal paste, the resultant body is heated to evaporate the organic solvent and the binder resin and to sinter the metal paste. The heating may be performed by a single process or divided into processes. For example, the following processes may be performed: the porous resin body is coated with the metal paste and the resultant body is then heated at a low temperature to evaporate the organic solvent; and the resultant body is subsequently immersed in the first molten salt and heated to decompose the body and sinter the metal paste. By such processes, the metal layer can be readily formed.

The material of the porous resin body can be selected from resins that can be decomposed at a temperature equal to or less than the melting point of the metal. Examples of the material of the porous resin body include polyurethane, polypropylene, and polyethylene. An urethane foam, which is a material that has a high porosity and is susceptible to pyrolysis, is preferred as the porous resin body (the eighth invention of the present application). The porosity of the porous resin body is preferably 80% to 98%; and the pore size of the porous resin body is preferably about 50 to 500 μm.

An invention described in the tenth invention of the present application is a porous aluminum body including continuous pores, wherein an oxygen content of a surface of the porous aluminum body is 3.1 mass % or less, the oxygen content being determined by energy dispersive X-ray spectroscopy (EDX) at an accelerating voltage of 15 kV. Since the porous aluminum body contains continuous pores and has a small amount of oxide in the surface thereof (thin oxide layer), when the porous aluminum body is used as a battery electrode material or an electrode material for an electrical double layer capacitor, the amount of an active material held thereon can be made large and the contact resistance between the active material and the porous aluminum body can be made low. As a result, use efficiency of the active material can be enhanced.

Figure 3:
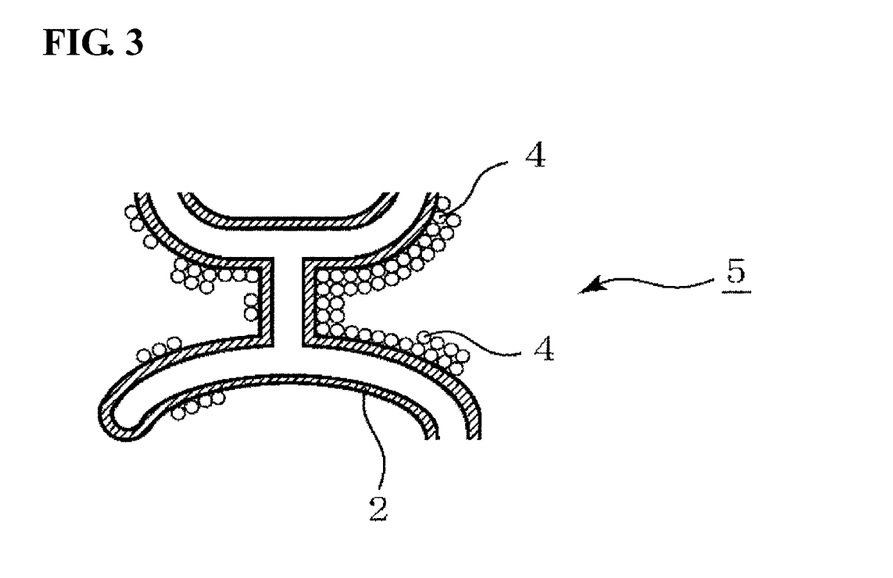
FIG. 3 is an enlarged schematic view illustrating a portion of a section of a battery electrode material.

An invention described in the eleventh invention of the present application is a battery electrode material including the porous metal body produced by the production method or the porous aluminum body; and an active material held on the porous body. FIG. 3 is an enlarged schematic view illustrating a section of a battery electrode material. In a battery electrode material 5, an active material 4 is held on the surface of an aluminum skeleton part (aluminum layer) 2 of the porous aluminum body. The porous aluminum body can be made to have a high porosity and a large surface area and hence the amount of the active material held thereon can be increased. In addition, even when the active material is applied to a small thickness, a large amount of the active material can be held. Thus, the distance between the active material and the collector (porous aluminum body) can be shortened and hence use efficiency of the active material can be enhanced.

An invention described in the twelfth invention of the present application is a battery including the battery electrode material for one or both of a positive electrode and a negative electrode. By using the battery electrode material, a battery can be made to have a high capacity.

An invention described in the thirteenth invention of the present application is an electrode material for an electrical double layer capacitor, the electrode material including the porous metal body produced by the production method or the porous aluminum body; and an electrode active material that contains activated carbon as a main component and is held on the porous body. As in the battery electrode material, in the electrode material for an electrical double layer capacitor, an electrode active material is held on the surface of an aluminum skeleton part (aluminum layer) of the porous aluminum body. As in the battery electrode material, the amount of the electrode active material held can be increased and use efficiency of the electrode active material can be enhanced.

An invention described in the fourteenth invention of the present application is an electrical double layer capacitor including the electrode material for an electrical double layer capacitor. By using the electrode material for an electrical double layer capacitor, a capacitor can be made to have a high output and a high capacitance.

An invention described in the fifteenth invention of the present application is a method for producing a porous metal body, the method including decomposing a porous resin body that contains continuous pores and has a metal layer thereon by immersing the porous resin body in supercritical water. Supercritical water at a high temperature and a high pressure beyond the critical point of water (critical temperature: 374° C., and critical pressure: 22.1 MPa) is excellent in the capability of degrading organic matter and can decompose a porous resin body without oxidizing metal. Use of the production method can provide a porous metal body having a small amount of an oxide layer (with a small thickness) in the surface thereof.

Advantageous Effects of Invention

According to the present invention, a porous metal body that contains continuous pores and has a thin oxide layer (low oxygen content) in the surface thereof can be obtained. Use of the porous metal body can provide an electrode material in which use efficiency of an active material is enhanced so that the capacity of a battery can be increased. A battery including the electrode material can be obtained.

DESCRIPTION OF EMBODIMENTS

Hereinafter, embodiments of the present invention will be described. In the explanation of the drawings, like elements are denoted by like reference signs and redundant explanations are omitted. The dimensional proportions in the drawings do not necessarily match those of what are described.

A method for producing a porous aluminum body will be described. A porous resin body containing continuous pores is first provided. The material of the porous resin body can be selected from resins that can be decomposed at a temperature equal to or less than the melting point of aluminum. Examples of the material of the porous resin body include polyurethane, polypropylene, and polyethylene. Although the term "porous resin body" is used, a resin having any shape can be selected as long as it contains continuous pores. For example, fibrous resins entangled in the form of nonwoven fabric may be used instead of the porous resin body. The porosity of the porous resin body is preferably 80% to 98%; and the pore size of the porous resin body is preferably about 50 to 500 μm. An urethane foam has a high porosity, continuity of pores, and uniformity of the pore size, and is also excellent in a pyrolysis property, and hence can be preferably used as the porous resin body.

An aluminum layer is formed on the surface of the porous resin body. The aluminum layer can be formed by a method, for example, a gas phase method such as vapor deposition, sputtering, or plasma CVD; coating with aluminum paste; or plating. Plating with aluminum in an aqueous solution is substantially impossible in terms of practicality and hence molten salt electrolytic plating of plating with aluminum in a molten salt is preferably performed. In molten salt electrolytic plating, for example, a two-component system salt of $AlCl_3$—XCl (X: alkaline metal) or a multicomponent system salt is used; the porous resin body is immersed in such a salt being molten and electrolytic plating is performed while a potential is applied to the aluminum layer. The molten salt may be a eutectic salt of an organic halide and an aluminum halide. The organic halide may be an imidazolium salt, a pyridinium salt, or the like. In particular, 1-ethyl-3-methylimidazolium chloride (EMIC) and butylpyridinium chloride (BPC) are preferred. To perform electrolytic plating, the surface of the porous resin body is subjected to a conductive treatment in advance. The conductive treatment can be selected from methods including, for example, electroless plating with a conducting metal such as nickel, vapor deposition and sputtering of aluminum or the like, and application of an electrically-conductive coating containing conducting particles such as carbon particles.

Alternatively, the aluminum layer may be formed by coating with aluminum paste. The aluminum paste is a mixture of aluminum powder, a binder (binder resin), and an organic solvent. The aluminum paste is preferably sintered in a non-oxidizing atmosphere.

The porous resin body on the surface of which the aluminum layer is formed is immersed in a first molten salt and heated while a negative potential is applied to the aluminum layer, to thereby decompose the porous resin body. The application of a negative potential to the aluminum layer immersed in a molten salt suppresses the oxidation reaction of aluminum. Heating in such a state results in decomposition of the porous resin body without oxidizing aluminum. Although the heating temperature may be appropriately selected in accordance with the type of the porous resin body, in order not to melt aluminum, the heating should be performed at a temperature equal to or less than the melting point (660° C.) of aluminum, preferably 600° C. or less. When urethane is selected for the porous resin body, since urethane decomposes in a molten salt at 380° C. or more, the heating temperature is preferably made 380° C. or more, more preferably in the temperature range of 500° C. or more and 600° C. or less. The magnitude of the negative potential applied is on the negative side with respect to the reduction potential of aluminum and on the positive side with respect to the reduction potential of a cation in the molten salt. By such a method, a porous aluminum body containing continuous pores and having a thin oxide layer and a low oxygen content in the surface thereof can be provided.

Examples of a salt constituting the first molten salt include lithium chloride (LiCl), potassium chloride (KCl), sodium chloride (NaCl), aluminum chloride ($AlCl_3$), lithium nitrate ($LiNO_3$), lithium nitrite ($LiNO_2$), potassium nitrate ($KNO_3$), potassium nitrite ($KNO_2$), sodium nitrate ($NaNO_3$), and sodium nitrite ($NaNO_2$). To decrease the melting point, two or more of such salts are preferably mixed to form a eutectic salt. When ions of a metal with respect to which the electrode potential of the layer of a metal such as aluminum is noble, that is, ions of a metal having a low ionization tendency are contained in the molten salt, the metal precipitates in the metal layer and becomes impurities, which is not preferable. When a urethane foam is used as the porous resin body, the heating temperature of the first molten salt is preferably made 380° C. or more. Urethane can be properly pyrolyzed at 380° C. or more. Examples of a eutectic salt that melts at 380° C. or more include LiCl—KCl, $CaCl_2$—LiCl, $CaCl_2$—NaCl, $LiNO_3$—$NaNO_3$, $Ca(NO_3)_2$—$NaNO_3$, and $NaNO_2$—$KNO_3$.

Figure 8:
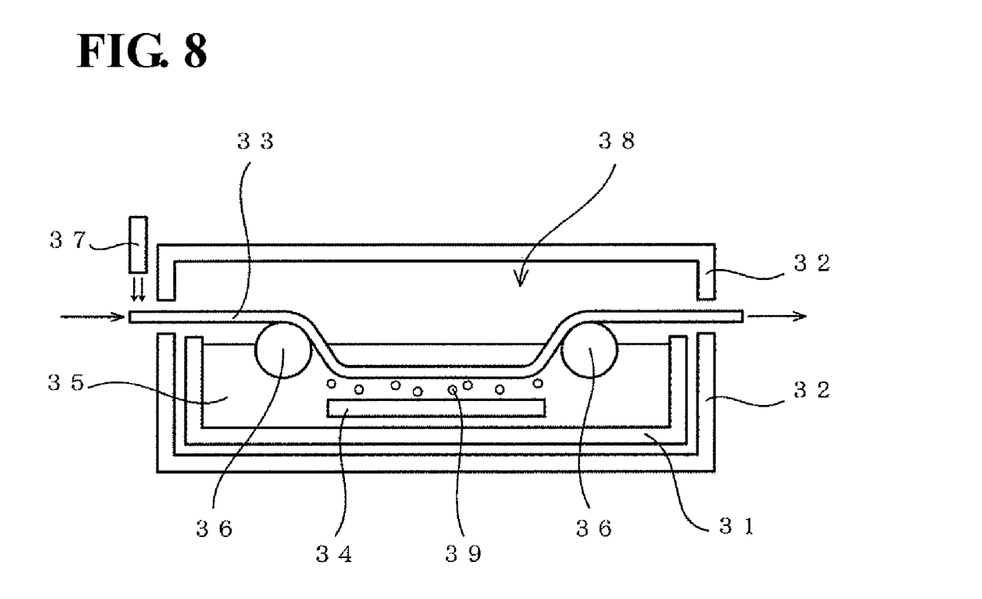
FIG. 8 is a schematic explanatory view of an apparatus for decomposing a porous resin body in a molten salt.

FIG. 8 is a schematic explanatory view illustrating a step of decomposing a porous resin body in a molten salt in further detail. A molten salt 35 is placed in a molten salt bath 31 and heated. To keep the molten salt at a high temperature, the molten salt bath 31 is disposed within a container 32. A treatment sample 33 (porous resin body having a metal layer thereon) enters the container 32 from the left side in the figure and is routed along guide rollers 36 and immersed in the molten salt 35. To immerse the treatment sample 33 in the molten salt, a press plate or the like (not shown) is disposed above the treatment sample 33. The treatment sample 33 in which the porous resin body has been decomposed in the molten salt 35 (porous metal body) is withdrawn from the molten salt 35. A positive electrode (not shown) is disposed in the molten salt bath 31.

The electrode (not shown) applies a negative potential to the treatment sample 33 and oxidation of the metal layer can be suppressed while the treatment sample 33 is immersed in the molten salt 35. However, since the heating temperature of the molten salt is a very high temperature of 380° C. to 600° C., an upper space 38 of the container 32 has a high-temperature atmosphere. When the upper space 38 contains oxygen, the metal layer of the treatment sample 33 to be immersed in the molten salt may be oxidized. Accordingly, an antioxidant measure that suppresses oxidation of the metal layer is preferably disposed. As the antioxidant measure, an inert-gas bubbling measure 34 may be disposed in the molten salt bath 31 to make an inert gas flow in the molten salt. Bubbles 39 of the inert gas generated from the inert-gas bubbling measure 34 fill the molten salt 35, pass through cavities (porous portion) of the treatment sample 33, and fill the space 38 above the molten salt. As a result, the entirety of the container 32 is filled with the inert-gas atmosphere and oxidation of the metal layer can be suppressed. In addition, as has been described, the advantages can be achieved in which oxygen derived from the decomposed resin is expelled from the molten salt 35 and the molten salt can be sufficiently stirred with the bubbles 39 of the inert gas.

As another antioxidant measure, an inert-gas ejection measure 37 may be disposed outside the container 32 so that an inert gas is sprayed onto the treatment sample 33 prior to entry into the container 32 to remove oxygen remaining within the porous body of the treatment sample 33. Such an inert-gas ejection measure may be disposed within the container 32. A measure that ejects an inert gas may be simply disposed such that the container 32 is filled with the inert-gas atmosphere.

(Battery)

Hereinafter, a battery electrode material and a battery that include a porous aluminum body will be described. For example, when the porous aluminum body is used for the positive electrode of a lithium-ion battery, examples of an active material used include lithium cobalt oxide ($LiCoO_2$), lithium manganese oxide ($LiMn_2O_4$), and lithium nickel dioxide ($LiNiO_2$). Such an active material is used in combination with a conductive assistant and a binder. Existing positive-electrode materials for lithium-ion batteries are obtained by applying an active material to the surface of an aluminum foil; to increase a battery capacity per unit area, the thickness of the active material applied is made large; and, to effectively use the active material, the aluminum foil and the active material need to be in electrical contact with each other and hence the active material is used as a mixture with a conductive assistant. In contrast, a porous aluminum body according to the present invention has a high porosity and a large surface area per unit area. Accordingly, even when an active material is held with a small thickness over the surface of the porous body, the active material can be effectively used. Thus, the battery capacity can be increased and the amount of a conductive assistant mixed can be reduced.

A lithium-ion battery includes a positive electrode constituted by the above-described positive-electrode material; a negative electrode composed of graphite; and an electrolyte constituted by an organic electrolyte. In such a lithium-ion battery, the capacity can be increased even when the electrode area is small. Accordingly, the energy density of the battery can be made high, compared with existing lithium-ion batteries.

A porous aluminum body may be used as an electrode material for a molten salt battery. When a porous aluminum body is used as a positive-electrode material, a metal compound into which a cation of a molten salt serving as the electrolyte can intercalate, such as sodium chromite ($NaCrO_2$) or titanium disulfide ($TiS_2$), is used as the active material. Such an active material is used in combination with a conductive assistant and a binder. The conductive assistant may be acetylene black or the like. The binder may be polytetrafluoroethylene (PTFE) or the like. When sodium chromite is used as an active material and acetylene black is used as a conductive assistant, they are strongly bound with PTFE, which is preferable.

A porous aluminum body can also be used as a negative-electrode material for a molten salt battery. When a porous aluminum body is used as a negative-electrode material, elemental sodium, an alloy of sodium and another metal, carbon, or the like may be used as the active material. Since sodium has a melting point of about 98° C. and the metal softens as the temperature increases, sodium and another metal (Si, Sn, In, or the like) is preferably alloyed. Of these, an alloy of sodium and Sn is particularly preferred because of ease of handling. Sodium or a sodium alloy can be held on the surface of a porous aluminum body by a method such as electrolytic plating or hot dipping. A sodium alloy can be formed by making a metal (Si or the like) to be alloyed with sodium adhere to a porous aluminum body by a method such as plating, and subsequently charging a molten salt battery including the porous aluminum body.

Figure 4:
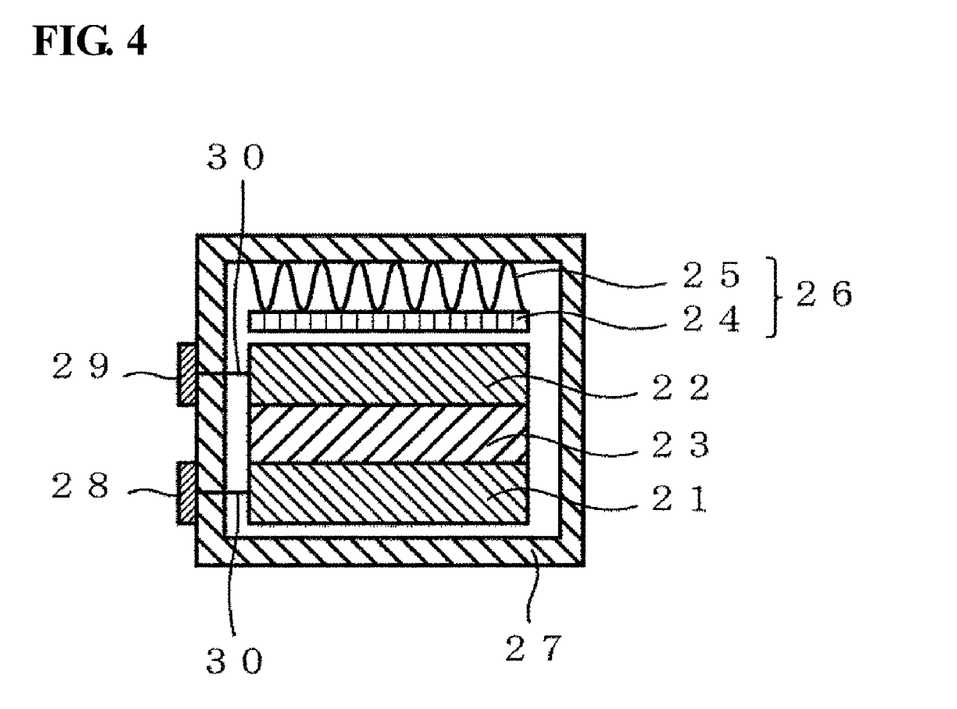
FIG. 4 is a schematic view illustrating an example of a molten salt battery according to the present invention.

FIG. 4 is a schematic sectional view illustrating an example of a molten salt battery including the battery electrode material. In the molten salt battery, a positive electrode 21 in which a positive-electrode active material is held on the surface of the aluminum skeleton part of a porous aluminum body; a negative electrode 22 in which a negative-electrode active material is held on the surface of the aluminum skeleton part of a porous aluminum body; and a separator 23 impregnated with a molten salt serving as an electrolyte, are contained in a case 27. A presser member 26 constituted by a presser plate 24 and a spring 25 pressing the presser plate is disposed between the upper surface of the case 27 and the negative electrode. By disposing the presser member, even when the volumes of the positive electrode 21, the negative electrode 22, and the separator 23 change, the presser member uniformly presses these members so that the members are in contact with each other. The collector (porous aluminum body) of the positive electrode 21 and the collector (porous aluminum body) of the negative electrode 22 are respectively connected to a positive terminal 28 and a negative terminal 29 through lead wires 30.

Examples of a molten salt serving as an electrolyte include various inorganic salts that melt at an operation temperature. For example, a molten salt containing an anion represented by the following formula (I) and at least one metal cation from alkaline metals and alkaline earth metals, is preferably used.

[Chem. 1]

(1)

In the formula (I), $R^1$ and $R^2$ each independently represent a fluorine atom or a fluoroalkyl group. In particular, a bis(fluorosulfonyl)amide ion (hereafter, FSA ion) in which $R^1$ and $R^2$ each represent F and a bis(trifluoromethylsulfonyl)amide ion (hereafter, TFSA ion) in which $R^1$ and $R^2$ each represent $CF_3$ are preferably used because the melting point of the molten salt can be decreased and the operation temperature of the battery can be decreased.

The cation of the molten salt may be one or more selected from alkaline metals such as lithium (Li), sodium (Na), potassium (K), rubidium (Rb), and cesium (Cs) and alkaline earth metals such as beryllium (Be), magnesium (Mg), calcium (Ca), strontium (Sr), and barium (Ba).

To decrease the melting point of the molten salt, two or more salts are preferably used as a mixture. For example, when KFSA and NaFSA are used in combination, the operation temperature of the battery can be made 90° C. or less.

The molten salt is used by impregnating a separator with the molten salt. The separator prevents the positive electrode and the negative electrode from coming into contact with each other and may be composed of a glass nonwoven fabric, a porous resin, or the like. The positive electrode, the negative electrode, and the separator impregnated with the molten salt are laminated, contained in a case, and used as a battery.

(Electrical Double Layer Capacitor)

A porous aluminum body can also be used as an electrode material for an electrical double layer capacitor. When a porous aluminum body is used as an electrode material for an electrical double layer capacitor, activated carbon or the like is used as the electrode active material. The activated carbon is used in combination with a conductive assistant and a binder. The conductive assistant may be graphite, carbon nano-tubes, or the like. The binder may be polytetrafluoroethylene (PTFE), styrene-butadiene rubber, or the like.

Figure 5:
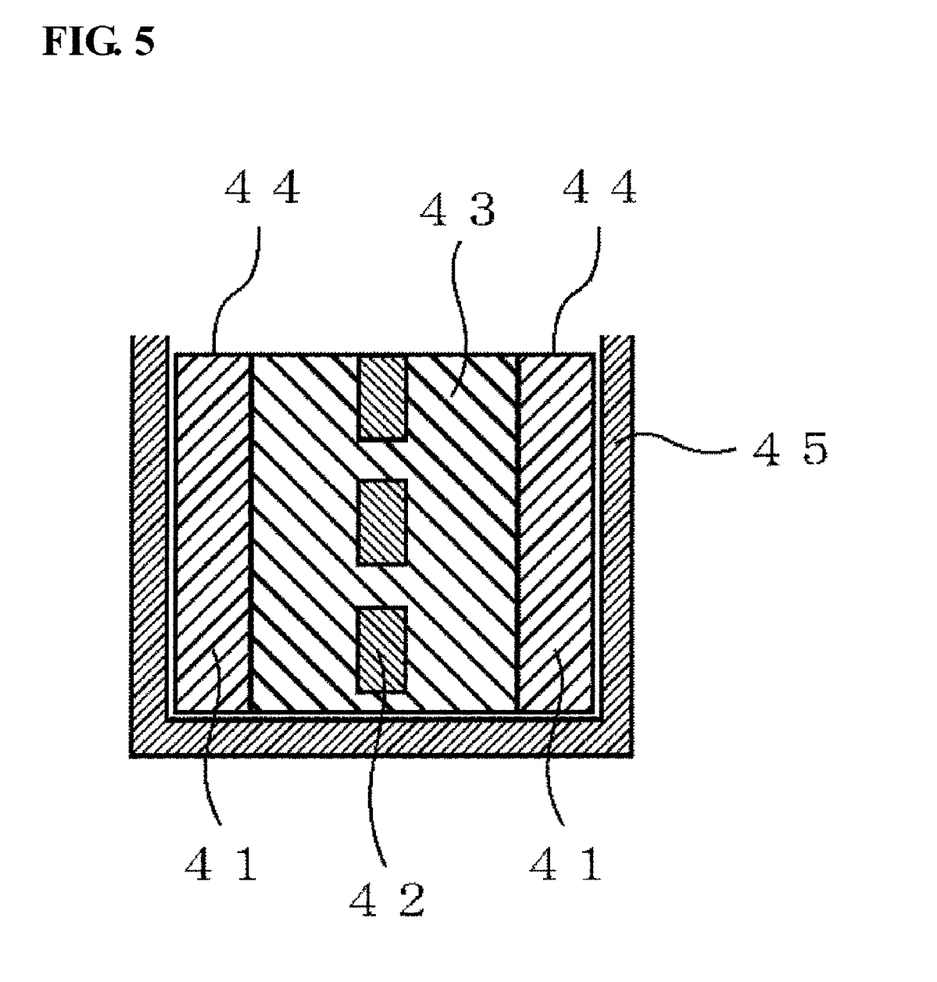
FIG. 5 is a schematic view illustrating an example of an electrical double layer capacitor according to the present invention.

FIG. 5 is a schematic sectional view illustrating an example of an electrical double layer capacitor including the electrode material for an electrical double layer capacitor. Electrode materials in which an electrode active material is held on porous aluminum bodies are disposed as polarizable electrodes 41 in an organic electrolyte 43 divided with a separator 42. The electrode materials 41 are connected to lead wires 44 and the entire structure including the electrode materials 41 is contained in a case 45. By using porous aluminum bodies as collectors, the surface area of the collectors is increased; and, even when activated carbon serving as the active material is applied to a small thickness to the collectors, an electrical double layer capacitor having a high output and a high capacitance can be obtained.

The embodiments where aluminum is used as the metal have been described so far. However, the present invention is not limited to aluminum but is useful as a method for producing a porous metal body in which oxidation is suppressed (the oxygen content is low) in the surface thereof. Specifically, nickel, copper, silver, or the like may be used.

Example 1

Production of Porous Aluminum Body:Formation of Aluminum Layer by Vapor Deposition Hereinafter, an example of producing a porous aluminum body will be specifically described. A polyurethane foam (thickness: 1 mm) having a porosity of 97% and a pore size of about 300 μm was provided as a porous resin body and cut into a square having 20 mm sides. Aluminum was vapor-deposited onto the surface of the polyurethane foam to form an aluminum layer having a thickness of 15 μm.
(Production of Porous Aluminum Body: Decomposition of Porous Resin Body)

Figure 6:
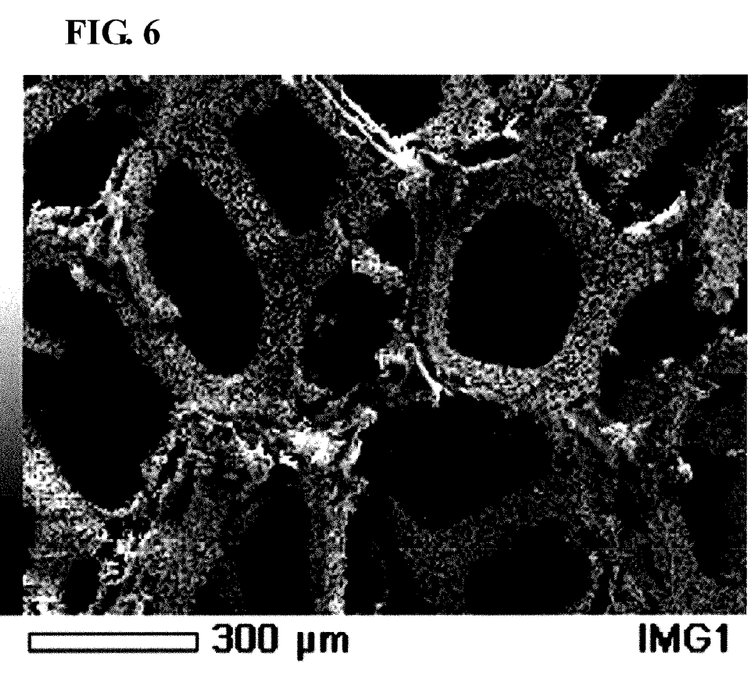
FIG. 6 is a scanning electron microscope (SEM) photograph of a section of a porous aluminum body.
Figure 7:
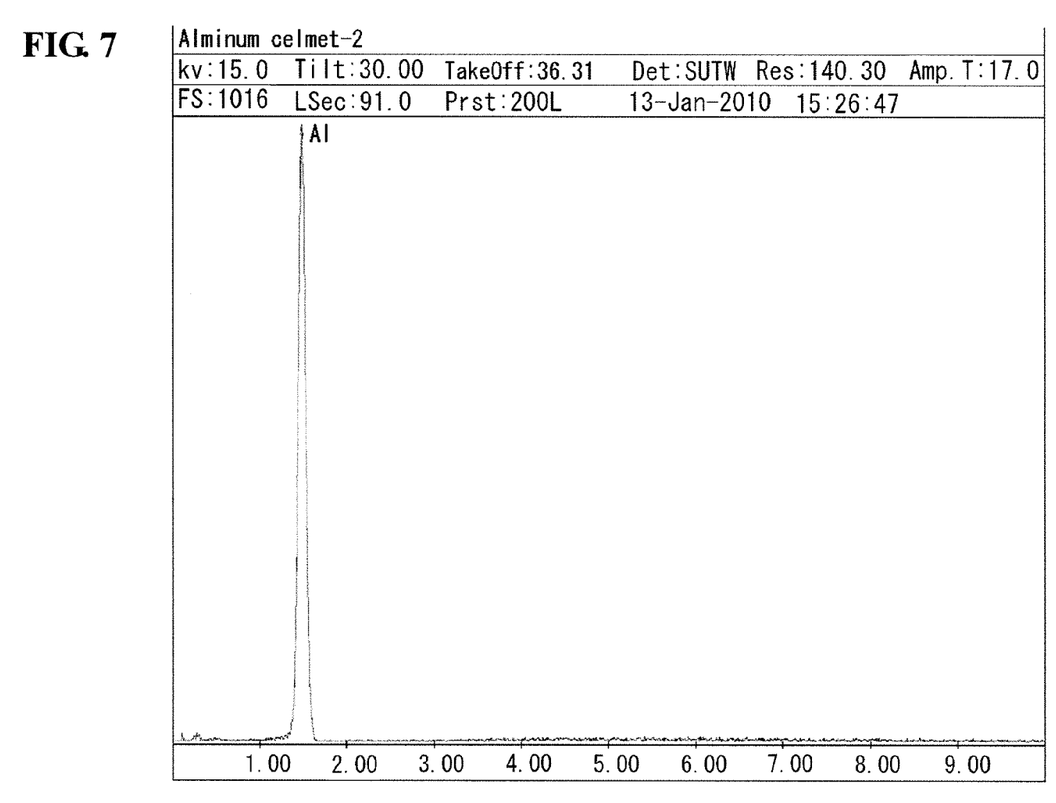
FIG. 7 illustrates an EDX result of a porous aluminum body.

The porous resin body having the aluminum layer was immersed in LiCl—KCl eutectic molten salt at 500° C. and a negative potential of −1 V was applied thereto for 30 minutes. Bubbles were generated in the molten salt, which probably showed the occurrence of the decomposition reaction of polyurethane. The molten salt was then cooled in the air to room temperature and a porous aluminum body was cleaned with water to remove the molten salt. Thus, the porous aluminum body was obtained. A SEM photograph of the obtained porous aluminum body is illustrated in FIG. 6. FIG. 6 shows that the obtained porous aluminum body contains continuous pores and has a high porosity. The result of subjecting the surface of the obtained porous aluminum body to EDX at an accelerating voltage of 15 kV is illustrated in FIG. 7. Substantially no peaks of oxygen were observed and hence the oxygen content of the porous aluminum body was equal to or less than the detection limit (3.1 mass %) of EDX. A battery including the obtained porous aluminum body was evaluated and it worked properly.

Example 2

A polyurethane foam (thickness: 1 mm) having a porosity of 97% and a pore size of about 300 μm was provided as a porous resin body and cut so as to have a width of 100 mm and a length of 200 mm. Aluminum was vapor-deposited onto the surface of the polyurethane foam to form an aluminum layer having a thickness of 15 μm. LiCl—KCl eutectic molten salt was placed in an aluminum bath having a width of 160 mm, a length of 430 mm, a depth of 80 mm, and a thickness of 10 mm and heated at 500° C. While nitrogen gas was made to flow in the LiCl—KCl eutectic molten salt at a flow rate of $3 \times 10^{-4}$ m$^3$/s, the porous resin body having the aluminum layer was immersed in the molten salt for 5 minutes. A negative potential of 1.1 V was applied to the aluminum layer. Bubbles were generated in the molten salt, which probably showed the occurrence of the decomposition reaction of polyurethane. The molten salt was then cooled in the air to room temperature and a porous aluminum body was cleaned with water to remove the molten salt. Thus, the porous aluminum body was obtained. The surface of the obtained porous aluminum body was subjected to EDX at an accelerating voltage of 15 kV, and it was found that the oxygen content was 2.9 mass % and the carbon content was 1.54 mass %.

Example 3

A porous aluminum body was produced and evaluated by the same procedures as in EXAMPLE 2 except that nitrogen gas was not made to flow in the molten salt. The oxygen content was 7.61 mass % and the carbon content was 1.74 mass %. The oxygen content and the carbon content were slightly high, compared with EXAMPLE 2 in which the resin was decomposed while nitrogen gas was made to flow in the molten salt.

Embodiments and Examples disclosed herein are given by way of illustration in all the respects, and not by way of limitation. The scope of the present invention is indicated not by the above descriptions but by the Claims and embraces all the modifications within the meaning and range of equivalency of the Claims.

INDUSTRIAL APPLICABILITY

According to the present invention, a porous metal body containing continuous pores and having a thin oxide film (low oxygen content) in the surface thereof can be obtained. Use of such a porous metal body can provide an electrode material in which use efficiency of an active material can be enhanced so that the capacity of a battery can be increased; and the porous metal body can be suitably applied to a battery including the electrode material.

REFERENCE SIGNS LIST

1 porous resin body
2 metal layer
3 porous metal body
4 active material
5 battery electrode material
11 porous resin body having metal layer thereon
12 positive electrode
13 first molten salt
21 positive electrode
22 negative electrode
23 separator
24 presser plate
25 spring
26 presser member
27 case
28 positive terminal
29 negative terminal
30 lead wire
31 molten salt bath
32 container
33 treatment sample
34 inert-gas bubbling measure
35 molten salt
36 guide roller
37 inert-gas ejection measure
38 upper space
39 bubble
41 polarizable electrode
42 separator
43 organic electrolyte
44 lead wire
45 case

The invention claimed is:
1. A method for producing a porous metal body, comprising a step of decomposing a porous resin body that contains continuous pores and has a layer of a metal thereon by heating the porous resin body at a temperature equal to or less than a melting point of the metal while the porous resin body is immersed in a first molten salt and a negative potential is applied to the metal layer.
2. The method for producing a porous metal body according to claim 1, wherein the first molten salt is one or more selected from the group consisting of LiCl, KCl, NaCl, $AlCl_3$, $LiNO_3$, $LiNO_2$, $KNO_3$, $KNO_2$, $NaNO_3$, and $NaNO_2$.

3. The method for producing a porous metal body according to claim 1, wherein the metal is aluminum.

4. The method for producing a porous metal body according to claim 1, wherein, in the step of decomposing the porous resin body, an antioxidant measure that suppresses oxidation of the metal layer is provided.

5. The method for producing a porous metal body according to claim 4, wherein the antioxidant measure is configured to make an inert gas flow in the first molten salt.

6. The method for producing a porous metal body according to claim 1, wherein, after a surface of the porous resin body is subjected to a conductive treatment, the porous resin body is plated with the metal in a second molten salt to form the metal layer.

7. The method for producing a porous metal body according to claim 1, wherein a surface of the porous resin body is coated with a metal paste to form the metal layer.

8. The method for producing a porous metal body according to claim 1, wherein the porous resin body is a urethane foam.

9. The method for producing a porous metal body according to claim 8, wherein the heating is performed at a temperature of 380° C. or more and 600° C. or less.

* * * * *